United States Patent [19]

Kauffman

[11] 4,033,410

[45] July 5, 1977

[54] MONOETHANOLAMINE PROCESS FOR SULFUR REMOVAL FROM CIRCULATING OIL USED IN SOUR GAS WELLS

[75] Inventor: David Kauffman, Houston, Tex.

[73] Assignee: Shell Oil Company, Houston, Tex.

[22] Filed: Feb. 20, 1976

[21] Appl. No.: 659,862

[52] U.S. Cl. .......................... 166/244 C; 166/265; 166/267; 166/312; 423/228; 423/229
[51] Int. Cl.$^2$ .................. E21B 43/00; B01D 53/34
[58] Field of Search ............... 166/244 C, 265, 266, 166/267, 312; 299/4, 5, 6; 423/228, 229, 242, 575, 578; 23/293 S

[56] References Cited

UNITED STATES PATENTS

| | | | |
|---|---|---|---|
| 2,176,441 | 10/1939 | Ulrich et al. | 423/228 |
| 2,238,201 | 4/1941 | Wilson et al. | 423/228 X |
| 2,613,132 | 10/1952 | Hutchinson | 423/228 |
| 2,688,368 | 9/1954 | Rodgers et al. | 166/267 |
| 2,890,931 | 6/1959 | McCreary | 423/229 |
| 3,228,874 | 1/1966 | Morgan | 423/228 X |
| 3,393,733 | 7/1968 | Kuo et al. | 166/267 |
| 3,744,565 | 7/1973 | Brown | 166/267 |
| 3,826,811 | 7/1974 | Hakka | 166/312 X |

Primary Examiner—Stephen J. Novosad
Assistant Examiner—George A. Suchfield

[57] ABSTRACT

Circulating oil used for removal of sulfur in sour gas wells is contacted with an aqueous solution of an organic amine and allowed to separate into an oil phase and an aqueous amine phase containing the sulfur. The oil is then returned to circulation to the gas well and the aqueous amine phase is removed for regeneration which is accomplished by precipitating the sulfur with $CO_2$ and stripping out the $CO_2$ from the aqueous amine solution with heat and/or vacuum.

5 Claims, 7 Drawing Figures

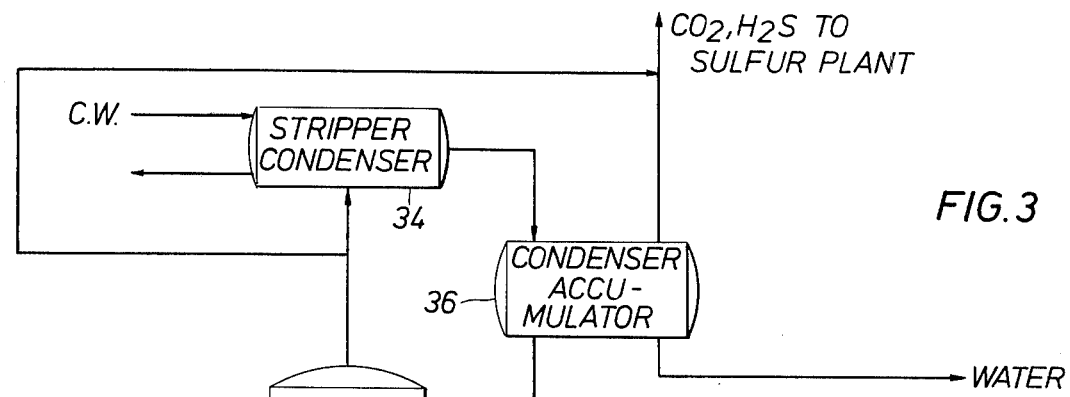
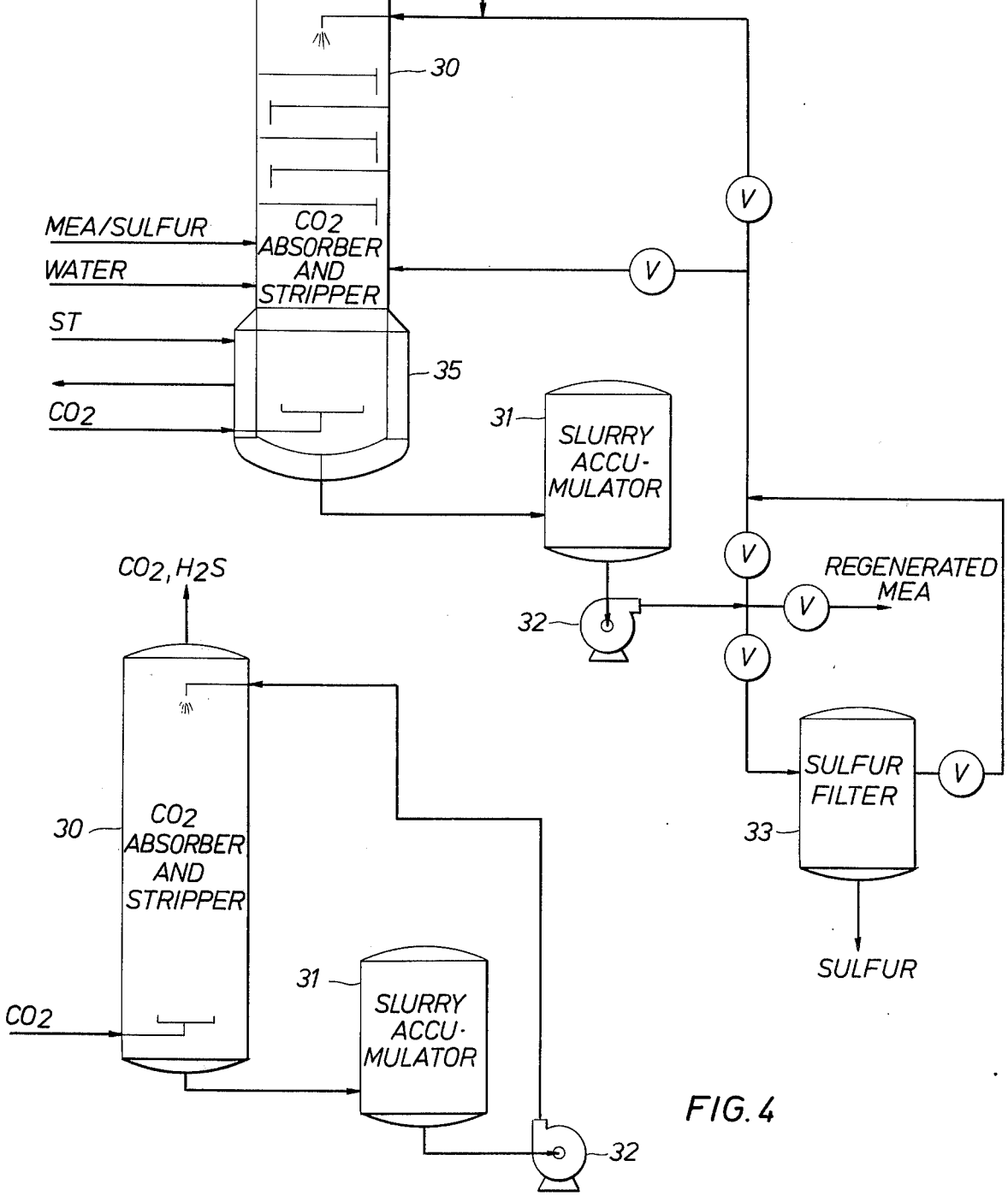
FIG. 3
FIG. 4

MONOETHANOLAMINE PROCESS FOR SULFUR REMOVAL FROM CIRCULATING OIL USED IN SOUR GAS WELLS

BACKGROUND OF THE INVENTION

In deep sour gas wells oil may be pumped down the annulus between the well casing and the production tubing in order to prevent sulfur deposition and to carry oil-soluble corrosion inhibitors. Alternatively, oil may be injected into surface gathering lines to prevent sulfur deposition. The oil flows back up through the production tubing along with the produced gases, is separated from the gases at the gas plant, and recycled back to the wells (U.S. Pat. No. 3,393,733). As the oil circulates, it absorbs the small amounts of elemental sulfur, which are often produced by the wells. Since the oil is recirculated, there is a continuous increase in sulfur concentration. In order to operate over long periods of time, it is necessary to control the sulfur concentration by removing it from the oil as fast as it is added. Use of an alkali sulfide solution to extract sulfur (U.S. Pat. No. 3,474,028) is incompatible with the use of high molecular weight organic corrosion inhibitors due to the formation of stable oil/water emulsions. Accordingly, as more particularly described hereinafter, the present invention provides an alternate process for removal of sulfur from the circulating oil.

A patent of some pertinence to the present invention, U.S. Pat. No. 3,826,811 to Hakka, also relates to a process for inhibiting sulfur deposits in hydrocarbon gas wells. However, the invention of this patent is limited to directly contacting the hydrocarbon gas with an aqueous solution of monoethanolamine, dissolving the sulfur in the solution, and separating the solution from the hydrocarbon gas. By contrast, in the present invention a circulating oil removes the sulfur from the gas and an organic amine is employed to remove the sulfur from the circulating oil. Separation of the organic amine and circulating oil is substantially complete in the present invention, and there is sufficient water in the oil so that trace quantities of organic amine which remain in the oil comprise less than 5% by weight of the organic amine and water as required as a lower concentration limit in the Hakka patent.

A second pertinent patent, U.S. Pat. No. 2,890,931 to McCreary, pertains to the treatment of natural gas with aqueous monoethanolamine to remove sulfur impurities and regenerating the monoethanolamine by steam stripping. By comparison, the present invention employs $CO_2$ to precipitate sulfur from the aqueous organic amine solution. While heat may be employed in the present invention to strip out the $CO_2$, the heating is by indirect heat exchange and does not involve direct steam contact as in the McCreary process.

SUMMARY OF THE INVENTION

The primary purpose of this invention resides in extracting sulfur from circulating oil used to prevent sulfur deposition in deep sour gas wells.

The above purpose has been achieved by extracting sulfur from circulating oil used to prevent sulfur deposition in deep sour gas wells with aqueous solutions of organic amines.

The organic amine solution utilized for extracting sulfur from the circulating oil preferably is regenerated by precipitating the sulfur with carbon dioxide. Among the organic amines, monoethanolamine, diethanolamine, triethanolamine, diisopropanolamine, ethylene diamine and morpholine are preferred. Monoethanolamine is most preferred since it is as good or better than the preceding amines and is readily available.

Within the framework of the above described methods, the present invention not only solves the above mentioned problems of the prior art, but also achieves further significant advantages as described hereinafter.

DESCRIPTION OF THE DRAWINGS

FIG. 3 schematically depicts a batch process for organic amine regeneration;

FIGS. 4-6 pertain to alternate uses of parts of the FIG. 3 process, respectively, $CO_2$ absorption and sulfur precipitation, sulfur filtration, and $CO_2$ stripping.

DESCRIPTION OF PREFERRED EMBODIMENTS

The process of this invention involves two major parts - sulfur absorption and organic amine regeneration. The regeneration process may be either a continuous process or a batch process. Monoethanolamine is used as a typical example of an organic amine and is hereinafter referred to as MEA.

The chemistry of the sulfur absorption part of the process is described as follows although it is understood that the present invention is not bound to this explanation. MEA is frequently used as a base to absorb acid gases such as $H_2S$ and $CO_2$ from other gas streams:

$$2 RNH_2 + H_2S \rightarrow (RNH_2)_2 \cdot H_2S$$

wherein $R = HOCH_2CH_2$. MEA will also interact with elemental sulfur, though here the interaction is more one of solubility rather than acid-base reaction. The MEA/S interaction is strong enough to extract dissolved and/or loosely bound sulfur from oil solutions.

As well as having an affinity for organic bases, sulfur easily bonds to itself to form polysulfides. It is likely that the MEA absorption process involves some reactions such as:

$$(RNH_2)_2 \cdot H_2S + xS \rightarrow (RNH_2)_2 H_2S_{x+1}$$

Sulfur in the oil may exist as dissolved elemental sulfur or as sulfur-organic compounds, such as mercaptans. These, in turn, can form polysulfides in the oil phase:

$$R'SH + S_x \rightarrow R'S_{x+1}H$$

wherein $R' = $ any of the many hydrocarbon species present in the oil. Both mercaptans and organic polysulfides may react to some extent with the MEA:

$$RNH_2 + R'SH \rightarrow RNH_3SR'$$

$$RNH_2 + R'S_{x+1}H \rightarrow RNH_3S_{x+1}R'$$

The distribution of these products between oil and MEA phases will vary greatly with $R'$. In a similar manner, any other acidic components in the oil can react with MEA. There will be a net loss of MEA if the product remains in the oil phase or does not decompose in the MEA regeneration process.

Figure 1:
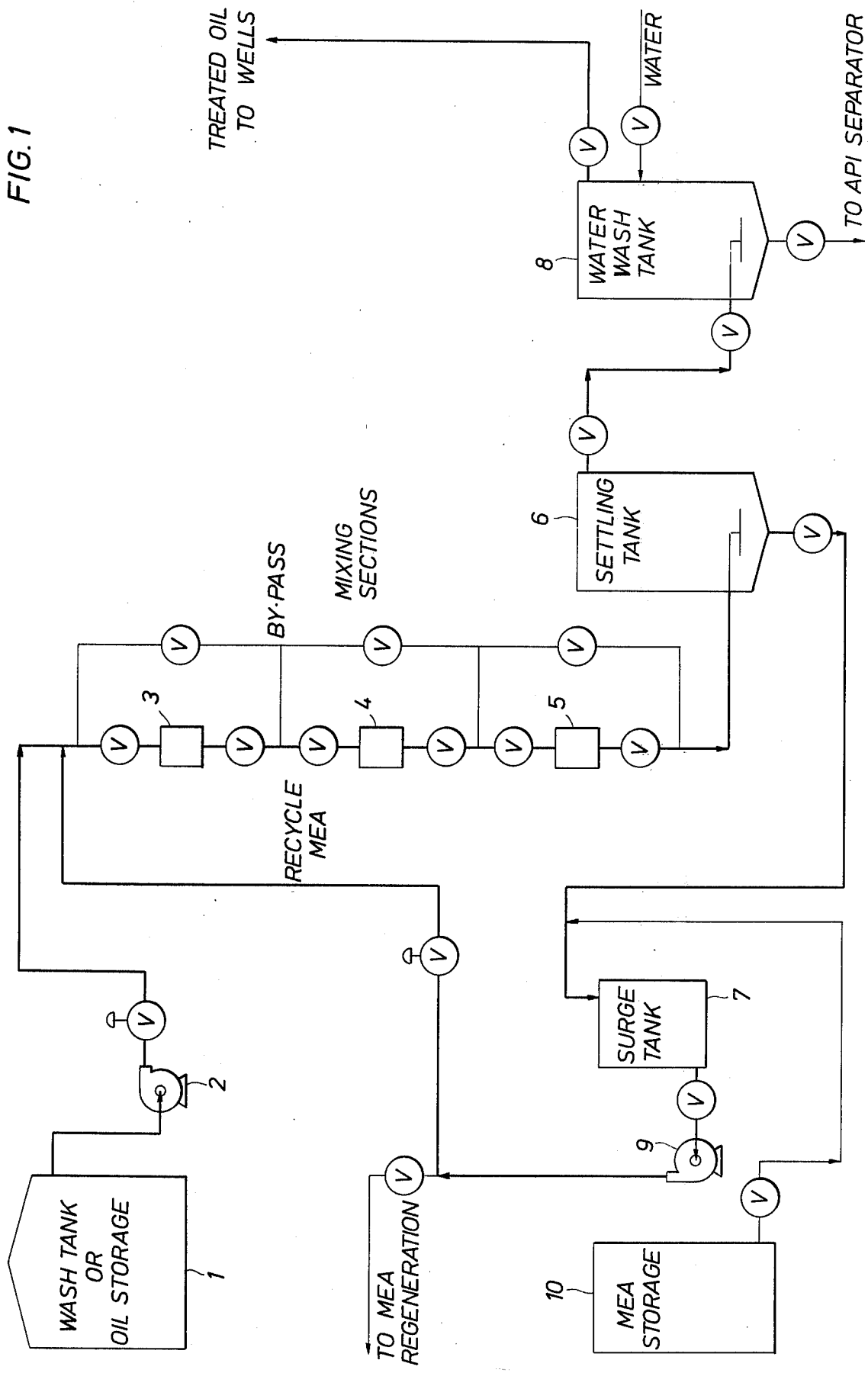
FIG. 1 schematically depicts a sulfur extraction process.

FIG. 1 is a flowsheet for the sulfur extraction portion of the process of the present invention. Oil containing sulfur is taken from a wash tank 1, or some other convenient storage point, and pumped through a series of static mixers 3, 4 and 5 along with a recycle MEA stream. The phases separate in a settling tank 6. The oil phase is washed with water and returned to the wells or gathering lines. The MEA phase is pumped back for further sulfur extraction.

An oil feed pump 2 takes oil from a convenient storage location, for example, wash tank 1, and pumps it into a mixing section. Static in-line mixing sections 3, 4 and 5 are used to provide turbulent mixing of the oil and MEA phases. The mixing sections consist of mixing elements inside pipe sections, pipes packed with Raschig rings or similar packing, or simply pipe sections of varying diameter. Three sections are used, with bypasses around each. It is not critical that three sections be employed since other numbers of sections could also be satisfactory. Any two will provide adequate mixing so that sections may be taken off line periodically for cleaning if necessary. Flow rates through the mixers are about six times the net oil flow rate since the MEA recycle rate will normally be about five times the oil rate. Alternatively, mixing may be carried out in other suitable vessels using a powered stirrer.

The MEA and oil phases separate in settling tank 6 with the MEA going to the bottom. The tank is sized to allow at least four hours residence time for the oil and an equal volume for the MEA phase. Flow into the tank is through a spreader near the bottom. Flow out is by gravity, oil going overhead and MEA going out through the bottom, through a boot and into a small surge tank 7 which is not required for the actual chemical process, but can provide easier start-up, flow control and monitoring of the MEA system.

A water wash of the treated oil may be helpful in avoiding carryover of small amounts of MEA, particularly when the MEA has a high sulfur content, but it is not required for the actual chemical process. Wash tank 8 uses a stationary water phase. Oil enters through a spreader at the bottom, rises through the water, and flows by gravity out the top. Since the oil and water are not mixed vigorously, settling is rapid. Whenever the water becomes too dirty, it is drained out the bottom and replaced with fresh water. Produced water from wash tank 1 may be a suitable supply. Various alternatives are suitable under varying operating conditions: 1) no water wash tank; 2) water wash tank with no mixing; and 3) water wash tank with recirculated water and active mixing of oil and water phases. MEA circulation pump 9 returns MEA from the MEA surge tank back to the mixing sections. It is also used to pump MEA to the regeneration section described later. A suitable storage tank 10 for make-up MEA is provided. It feeds into the MEA surge tank by either gravity or pumping.

It is possible to use a single pump to handle both the incoming oil and the recycled MEA, with both streams being fed to the pump inlet. The use of two pumps, however, permits better operating control.

The chemistry of the MEA regeneration portion of the process is described as follows, it again being understood that the present invention is not bound to this explanation. MEA containing sulfur can be recovered for reuse in the extraction process by precipitating the sulfur with carbon dioxide, removing the solid sulfur, and stripping out the carbon dioxide with heat. Carbon dioxide combines with MEA in the presence of water:

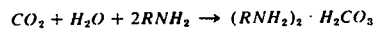

$$CO_2 + H_2O + 2RNH_2 \rightarrow (RNH_2)_2 \cdot H_2CO_3$$

Since the carbon dioxide interaction is stronger than that of sulfur, carbon dioxide will displace sulfur from MEA solution. The sulfur precipitates as yellow crystalline sulfur and is removed by settling and/or filtration. The MEA solution is then heated in a still to drive off the carbon dioxide.

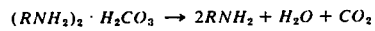

$$(RNH_2)_2 \cdot H_2CO_3 \rightarrow 2RNH_2 + H_2O + CO_2$$

Strong acids, such as HCl and $H_2SO_4$, will also cause the precipitation of sulfur from the MEA solution, but they also promote excessive degradation of the MEA and are therefore less suitable than $CO_2$.

Figure 2:
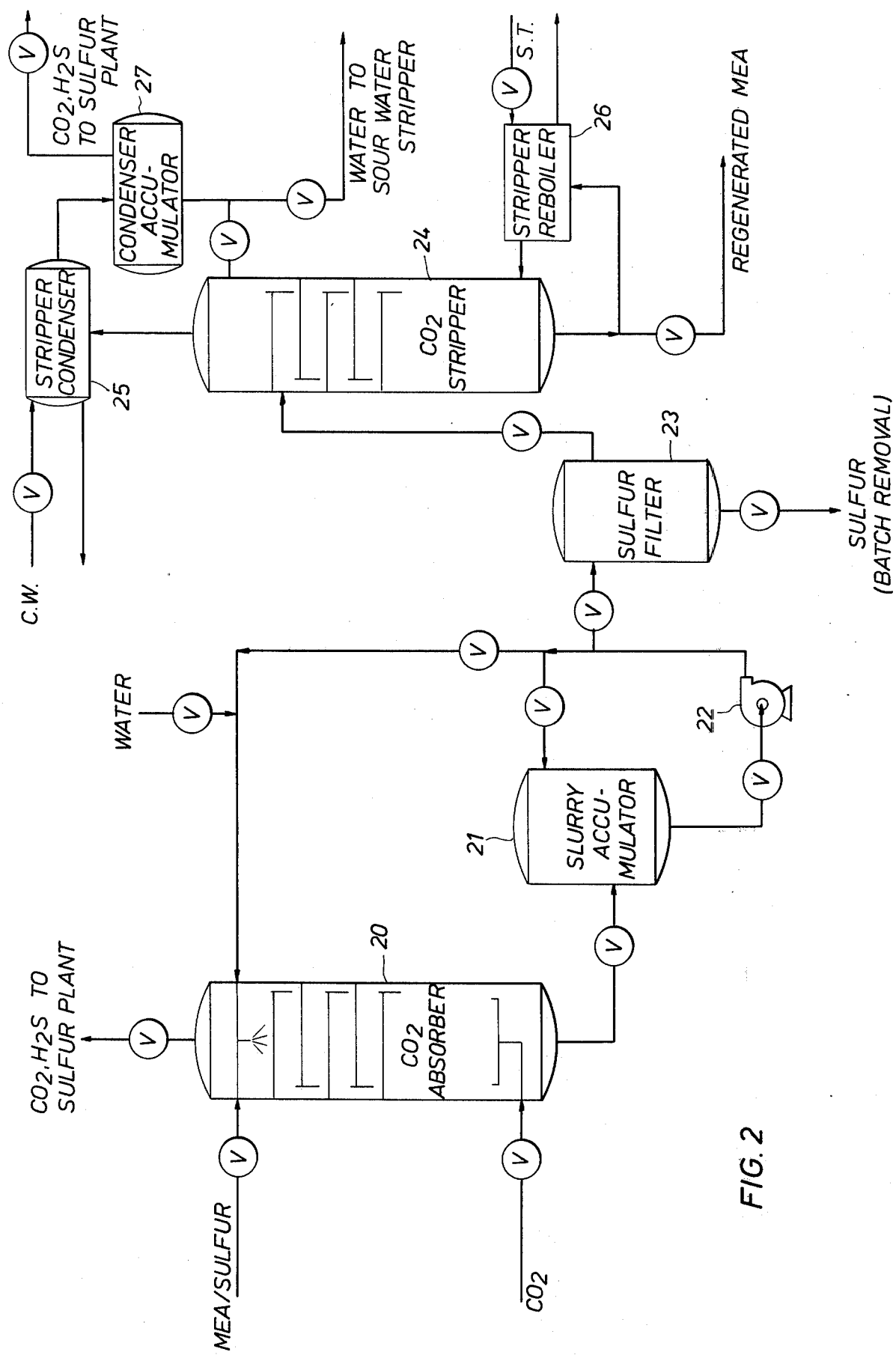
FIG. 2 schematically depicts a continuous process for organic amine regeneration.

A MEA regeneration continuous process is shown in FIG. 2 of the drawings. The MEA/sulfur solution is contacted with gaseous $CO_2$ in an absorber column 20. Sulfur precipitates as a crystalline solid. The column is operated at about atmospheric pressure and near ambient temperature. Water may be added to the MEA/sulfur solution to decrease viscosity and cut down foaming. Gases leaving the top of the column contain water vapor, $CO_2$ and $H_2S$ and are routed to a sulfur plant, incinerator or flare.

A well-stirred, sparged vessel (not shown) may be substituted for the column for this section of the process. $CO_2$ absorption efficiency is lower, but there is less likelihood of plugging with precipitated sulfur.

Slurry accumulator 21 provides surge capacity for the slurry of MEA and sulfur from $CO_2$ absorber 20. Slurry pump 22 returns the MEA/sulfur slurry to the column or the accumulator, or pumps it to a sulfur filter. Crystalline sulfur is removed from the MEA using a pressure vertical leaf filter, or some other suitable filter. Sulfur may be removed batchwise or continuously. If the amount of sulfur produced is small, it would not warrant use of a continuous-discharge filter. The sulfur can be combined with the rest of a sulfur plant's production if clean enough. Alternatively, the sulfur can be separated from the MEA by gravity settling. This is done in an accumulator or a similar vessel. Provision is made for skimming off the MEA and removing the solid sulfur. MEA losses through entrainment in a solid would be higher, but the filter would be eliminated.

$CO_2$ stripper 24, stripper condenser 25, stripper reboiler 26, and condenser accumulator 27 make up a standard stripping column for removal of $CO_2$ from MEA. Regenerated MEA is taken off the bottom of the column. Excess water is removed from the accumulator. $CO_2$, possibly containing small amounts of $H_2S$, is taken from the top of the column and is routed to a sulfur plant, incinerator or flare.

MEA regeneration may also be practiced as a batch process as shown in FIG. 3 of the drawings. In the batch process, column 30 is used for both $CO_2$ absorption and stripping. The absorption step requires operation at ambient temperature and pressure. $CO_2$ enters at the bottom and mixes with a batch of MEA/sulfur solution. The solution, ultimately a slurry, is recycled to the top of the column. $CO_2$, $H_2S$ and water vapor are sent to a sulfur plant, incinerator or flare. Slurry accumulator 31 serves as a reservoir for the MEA/sulfur slurry. Slurry pump 32 recirculates the MEA/sulfur slurry to the column or pumps it to the filter. Sulfur filter 33 is similar to that described for the continuous process. Again, it is possible that gravity settling would be sufficient. Stripper condenser 34, steam jacket heater 35, and condenser accumulator 36 provide for heat transfer and liquid accumulation during the stripping step. Design and operation is similar to that described for the continuous process. A separate reboiler may be substituted for the steam jacket heat exchanger around the base of the column.

FIG. 4 discloses how part of the apparatus of FIG. 3 is operated for $CO_2$ absorption and sulfur precipitation. $CO_2$ enters $CO_2$ absorber 30, and a bottom stream is passed into slurry accumulator 31 and pumped via pump 32 around to the top of the column 30, and $CO_2$ and $H_2S$ are removed from the top of the column.

Figure 5:
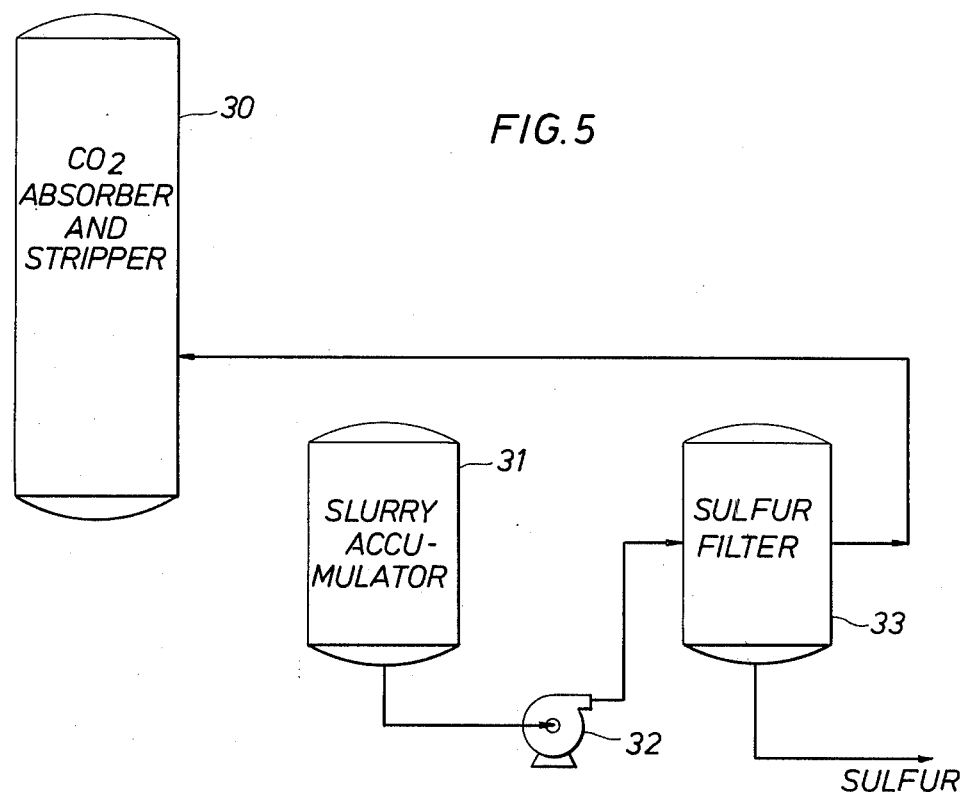

FIG. 5 discloses how part of the apparatus of FIG. 3 is employed for sulfur filtration. A stream from slurry accumulator 31 is passed through pump 32 to sulfur filter 33 and back to the middle of column 30. Sulfur is withdrawn at the bottom of sulfur filter 33.

Figure 6:
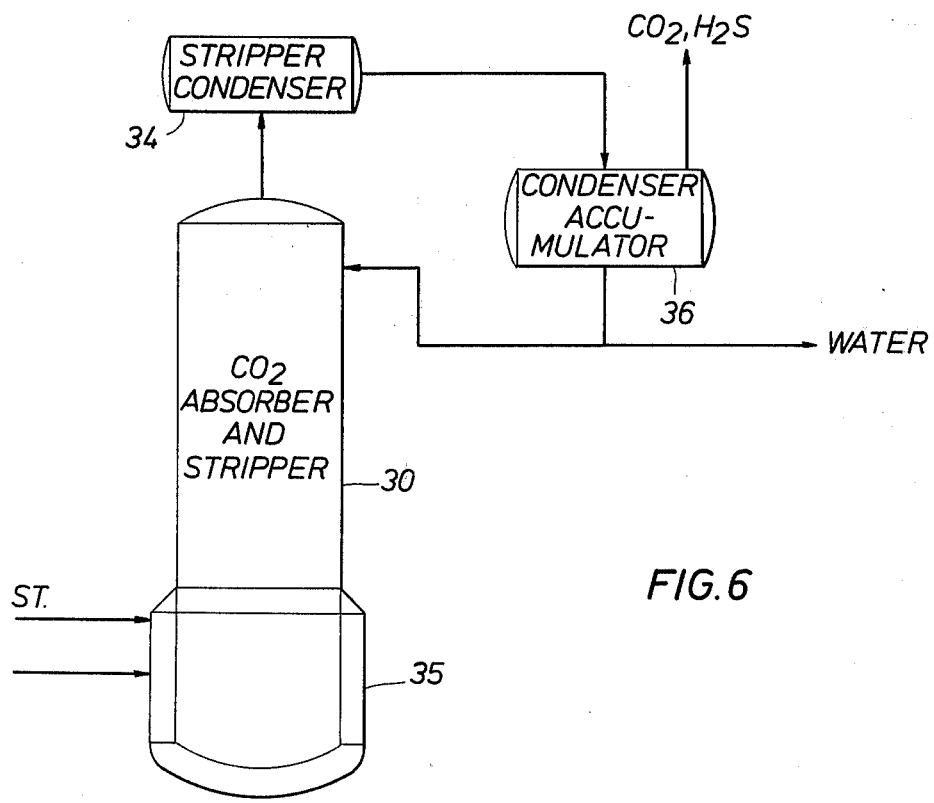

FIG. 6 discloses how part of the apparatus of FIG. 3 is utilized for $CO_2$ stripping. An overhead stream from column 30 is passed into stripper condenser 34 and then to condenser accumulator 36 where a bottom stream is withdrawn and returned to the column where part is ejected as water and gaseous stream is removed as $CO_2$ and $H_2S$.

Figure 7:
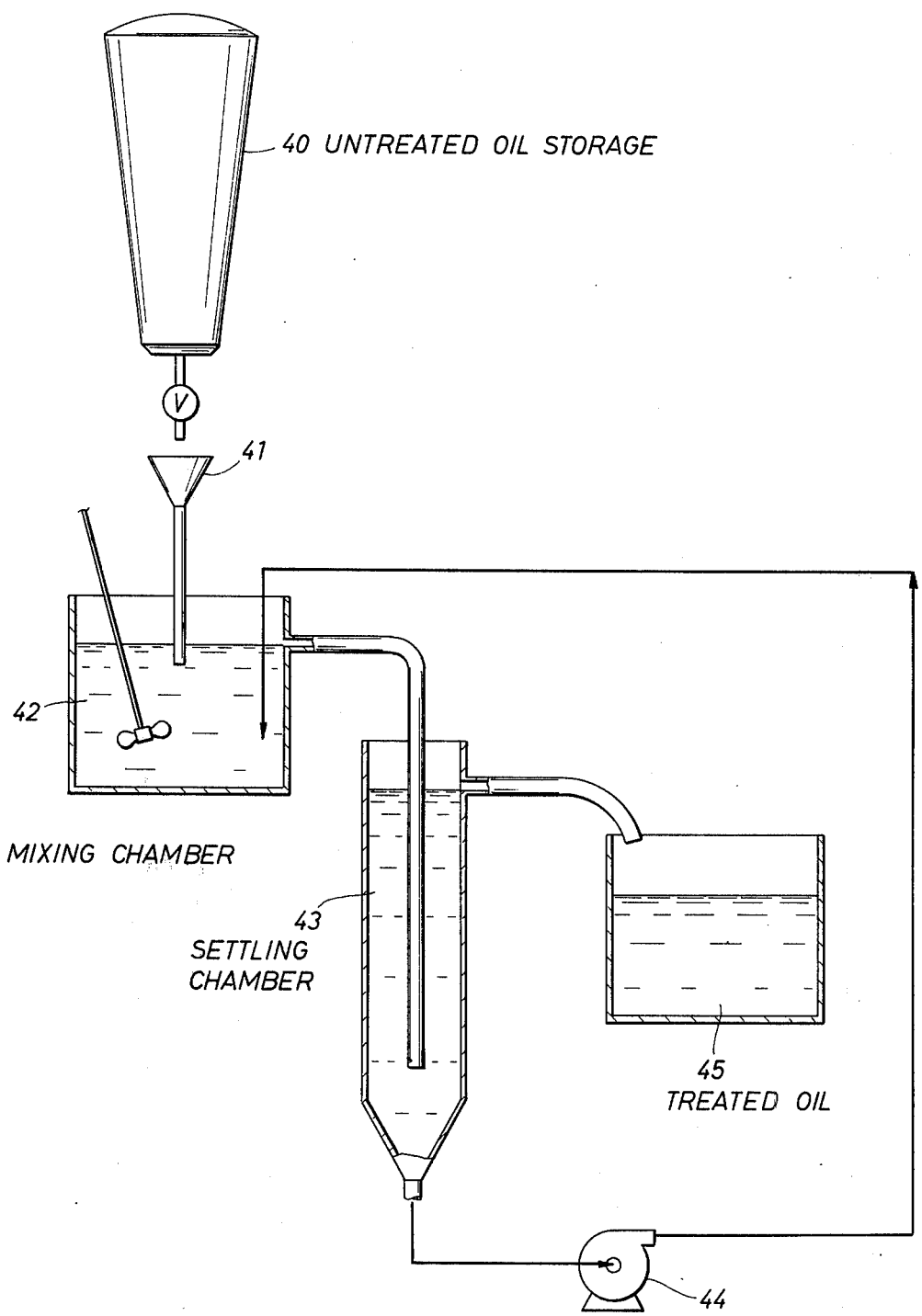
FIG. 7 pertains to laboratory apparatus for continuous extraction.

FIG. 7 pertains to laboratory apparatus for continuous extraction.

EXAMPLES

1. Extraction of sulfur from oils with aqueous amine solutions

Batch tests using laboratory separator funnels were used to extract sulfur dissolved in a typical lubrication oil stock. The oil was prepared by dissolving 2% by weight of elemental sulfur in the oil by heating to 160° C and stirring. The oil was cooled, then shaken with an equal volume of amine solution at room temperature. Amines tested included diisopropanolamine, ethylenediamine, monoethanolamine, diethanolamine, triethanolamine and morpholine. Sulfur removal from the oil ranged from 8 to 68% of the sulfur present, varying with the type of amine and the strength of the amine solution.

Continuous tests were carried out in a laboratory apparatus described in FIG. 7. Oil containing sulfur, prepared as above, dripped from a separator funnel 40, through a long-stem funnel 41, with the opening below the level of the liquid in the mixing chamber 42. The mixing chamber was a 250 ml beaker with a spout near the top rim. The chamber was stirred continuously and heated to about 60° C for best operation with the particular oil tested. The recirculating amine solution also entered the chamber below the liquid level to avoid entrainment of air. Overflow from the mixing chamber entered the bottom of a settling chamber 43, through a tube. The settling chamber was a glass cylinder 5 cm in diameter and 33 cm high with one outlet at the bottom and one outlet 2 cm from the top. This chamber was heated with a heating tape to 60° C. Extracted oil rose to the top of the chamber where it overflowed into the receiving vessel 45. The amine solution was recirculated to the mixing chamber by a pump 44.

4000 ml batches of oil containing 1.5 to 2.0% sulfur were treated using 300 to 400 ml of 50 to 75% MEA solution. An average of 45% of the sulfur in the oil was removed. The MEA phase had a sulfur content of 12% following the extraction.

2. Amine solution regeneration using $CO_2$ and heat:

Laboratory tests of regenerating MEA were carried out. 300 to 400 ml of MEA solution containing 10 to 20% sulfur were placed in a 500 ml graduated cylinder. $CO_2$ was sparged through the solution at a rate of 0.60 liters per minute. Sparging was continued until no further sulfur precipitation was observed, usually 2 to 3 hours. The precipitated sulfur collected was normally 80% or more of that originally in the amine solution.

The $CO_2$ was then stripped out of the treated MEA solutions by heating to 80° C under mild vacuum. The resulting MEA solution was then used for further extraction of sulfur from oil. In the stripping step, some water was lost from the solution, but it was replaced easily to obtain the desired amine strength in the aqueous solution.

I claim as my invention:

1. A process for inhibiting sulfur deposits in a hydrocarbon gas well or associated gathering lines containing hydrocarbon gas laden with sulfur in the form of hydrogen sulfide and dissolved elemental sulfur, comprising, contacting the hydrocarbon gas with oil in the well or gathering lines, absorbing the sulfur into the oil, removing the oil from the well or gathering lines, contacting the oil with an aqueous solution of an organic amine, dissolving the sulfur from the oil into the organic amine solution, separating the oil and organic amine solution, and regenerating the organic amine solution after contact with the oil by precipitating sulfur from the organic amine solution with $CO_2$.

2. A process for separating dissolved sulfur from aqueous organic amine solution comprising contacting the solution with $CO_2$ to precipitate the sulfur and separating the organic amine solution and precipitated sulfur.

3. The process of claim 2 wherein the organic amine solution contains sulfur dissolved from oil utilized in a hydrocarbon gas well to remove sulfur from the gas.

4. The process of claim 3 wherein the oil is also used to carry corrosion inhibitors into the gas well.

5. The process of claim 2 wherein the organic amine used is monoethanolamine.

* * * * *